United States Patent [19]
Holdt et al.

[11] 3,907,539

[45] Sept. 23, 1975

[54] PROCESS FOR PRESERVING CUT FLOWERS USING 2-BROMO-2-NITROPROPANEDIOL-(1,3)

[75] Inventors: Bernd-Dieter Holdt; Max-Heinz Sy, both of Dusseldorf, Germany

[73] Assignee: Henkel & Cie GmbH, Dusseldorf, Germany

[22] Filed: Apr. 17, 1974

[21] Appl. No.: 461,534

Related U.S. Application Data

[63] Continuation-in-part of Ser. No. 172,868, Aug. 18, 1971, abandoned.

[30] Foreign Application Priority Data

Mar. 18, 1971 Germany............................ 2113209

[52] U.S. Cl. ..................................................... 71/68
[51] Int. Cl.$^2$............................................ A01N 3/02
[58] Field of Search........................................ 71/68

[56] References Cited
UNITED STATES PATENTS

| | | | |
|---|---|---|---|
| 2,230,931 | 2/1941 | Bussert | 71/68 |
| 2,923,094 | 2/1960 | Ryan | 71/68 |
| 3,558,788 | 1/1971 | Clark et al. | 71/68 UX |

*Primary Examiner*—James O. Thomas, Jr.
*Attorney, Agent, or Firm*—Hammond & Littell

[57] ABSTRACT

An aqueous nutrient concentrate composition for preserving cut flowers consisting essentially of from 20 to 70 parts by weight of a sugar, from 0.2 to 3.0 parts by weight of acidic-reacting substances, from 0.01 to 1.0 parts by weight of 2-bromo-2-nitropropanediol-(1,3), from 0 to 0.1 parts by weight of plant growth promoting compounds, and the remainder, to 100 parts by weight, of water; as well as a process for preserving cut flowers using an aqueous solution of said concentrate.

6 Claims, No Drawings

PROCESS FOR PRESERVING CUT FLOWERS USING 2-BROMO-2-NITROPROPANEDIOL-(1,3)

CROSS REFERENCE TO RELATED APPLICATION

This application is a continuation in part application of copending U.S. pat. application Ser. No. 172,868, filed Aug. 18, 1971 and now abandoned.

THE PRIOR ART

Nutrient solvents for the preserving treatment of cut flowers customarily contain substances with antimicrobial or fungicidal effect.

In the selection of suitable substances from the large number of known compounds with germicidal effect, it has first to be considered that a sufficient water solubility of the addition has to exist. The compounds to be added have also to be colorless and have to be applicable in combination with other customary ingredients of the nutrient treating solutions or the nutrient preserving agents for the preparation of such solutions.

The limitation already imposed by the above named criteria of the number of suitable substances is further still substantially narrowed in that the germicidal additives have to be compatible with the respective cut flowers to be treated. This compatibility has to exist for an as great as possible number of plant species. A possible incompatibility of the germicidal additive with the plants is exhibited, for example, by the occurence of brownish discolorations in blossoms and particularly on the foliage, first in the form of brownish points which then extend over the whole blossom or leaf and cause a premature drying. This indeed differs from the proper withering process, but nevertheless impairs the appearance of the cut flowers. The last named fact presents a substantial disadvantage of the germicidal agents conventionally considered for this purpose.

OBJECTS OF THE INVENTION

An object of the present invention is in the process of preserving cut flowers by steps of adding a nutrient preserving composition containing a water-soluble germicide to the flower water and inserting cut flowers in said flower water, the improvement which consists of adding from 0.05 to 100 mg per liter of flower water of 2-bromo-2-nitropropanediol-(1,3) 1,3) as said water-soluble germicide.

Another object of the present invention is to provide an aqueous nutrient concentrate composition for preserving cut flowers consisting essentially of from 20 to 70 parts by weight of sugar, from 0.2 to 3.0 parts by weight of acidic-reacting substances, from 0.01 to 1.0 parts by weight of 2-bromo-2-nitropropanediol-(1,3), from 0 to 0.1 parts by weight of plant growth promoting compounds, and the remainder, to 100 parts by weight, of water.

A further object of the present invention is the development of a method of preserving cut flowers utilizing an aqueous solution of the above nutrient preserving composition.

These and other objects of the invention will become more apparent as the description thereof proceeds.

DESCRIPTION OF THE INVENTION

The above objects have been achieved and the drawbacks of the prior art overcome by the selection of a perserving and germicidal substance that at the same time meets the above-named requirements and does not possess the described disadvantages.

The problem is solved, according to the invention, in that the nutrient solutions for the preserving treatment of cut flowers and in preserving compositions for the preparation of such solutions, 2-bromo-2-nitropropanediol-(1,3) is used as the germicidal additive.

More particularly the present invention provides an aqueous nutrient concentrate composition for preserving cut flowers consisting essentially of from 20 to 70 parts by weight of a sugar, from 0.2 to 3.0 parts by weight of acidic-reacting substances, from 0.01 to 1.0 parts by weight of 2-bromo-2-nitropropanediol-(1,3), from 0 to 0.1 parts by weight of plant growth promoting compounds, and the remainder, to 100 parts by weight, of water.

The germicidal additive 2-bromo-2-nitropropanediol-(1,3), according to the invention, should be present in amounts of from 0.05 to 100 mg/l in the flower water treating solutions. In this range of amounts, 2-bromo-2-nitropropanediol-(1,3) is clearly soluble in a weakly acidic to neutral region. Also in the region of the upper concentration limit, it does not cause any damage to blossoms and foliage of cut flowers.

Good preserving effects can already be attained with nutrient treating solutions that contain, in addition to 2-bromo-2-nitropropanediol-(1,3), only 4 to 30 gm/l of the flower water of a sugar, for example, cane sugar. In accordance with this, also nutrient preserving compositions for the preparation of such treating solutions can consist in the simplest case of 2-bromo-2-nitropropanediol-(1,3) and a mono and/or disaccharide, such as mannose, gulose, glucose, saccharose and have, for example, the composition of 100 parts by weight of sugar and from 0.00075 to 0.75 parts by weight of 2-bromo-2-nitropropanediol-(1,3).

For the optimum effect, however, such nutrient treating solutions or agents contain still further ingredients, particularly such substances through which a weakly acidic reaction, preferably in the pH range of 4 to 6, of the nutrient flower water treating solution is attained. To these acidic reacting substances belong in the first place inorganic or organic aluminum salts, such as aluminum sulfate, aluminum chloride, ammonium-aluminum sulfate, sodium-aluminum sulfate, potassium-aluminum sulfate, aluminum tartronate, aluminum formate. Also nickel chloride or zinc chloride, organic acids, such as citric acid, tannic acid, tartaric acid, succinic acid or weak inorganic acids, such as boric acid, sodium bisulfate, sodium bisulfite or acidic sodium phosphates as well as buffered mineral acids may be used as acidic-reacting substances. Particularly good preserving effects can be attained if the active substance, to be used according to the invention, is used in combination with boric acid. Therefore, optionally, in the nutrient flower water treating solutions, the acidic-reacting substances consist at least partly of boric acid.

Other substances that are customarily present in preserving agents for cut flowers and can be also used in combination with the germicidal additions, according to the invention, are plant growth promoting substances, such as β-indolylacetic acid, chlorochloline chloride, gibberellinic acid, α-naphthylacetic acid, or 2,4-dichlorophenoxyacetic acid, 2-Bromo-2-nitropropanediol-(1,3)-is preferably used in combination with β-indolylacetic acid as the plant growth promoting substance. However, a complete compatibility also exists with the other cutomarily used plant growth stimulators.

Compositions for the preparation of solutions for the preserving treatment of cut flowers with a content of 2-bromo-2-nitropropanediol-(1,3) can be compounded in solid or liquid form.

Solid agents that contain beside the additive, used according to the invention, and sugars, also other ingredients, have the following composition:

| Parts by Weight | |
|---|---|
| 100 | A sugar |
| 0.25 to 15 | Acidic-reacting substances |
| 0.01 to 5 | 2-Bromo-2-nitropropanediol-(1,3) |
| 0 to 0.5 | Plant growth promoting substances. |

Analogous concentrated liquid agents may, for instance, have the following composition:

| Parts by Weight | |
|---|---|
| 20.0 to 70.0 | A sugar |
| 0.2 to 3.0 | Acidic-reacting substances |
| 0.01 to 1.0 | 2-Bromo-2-nitropropanediol-(1,3) |
| 0 to 0.1 | Plant growth promoting substances |
| | Residue to 100 parts by weight of water. |

The germicidal active substance, to be used according to the invention, is stable in such agents also over a longer period of time and is neither adversely affected in its effectiveness by long storage nor by the simultaneous presence of the other ingredients.

The solid nutrient compositions of the invention are utilized in amounts of at least 4 gm, preferably from 10 to 15 gm/liter in the flower water. The analogous concentrated liquid compositions are utilized in amounts of 20 to 50 gm/l in the flower water. Since the pH value in the application of the solid or concentrated liquid compositions in the flower water should be in the range of 4 to 6, particularly about 4.5 to 5.5, the compositions are adjusted accordingly.

The nutrient agents of the invention increase considerably the durability and life of cut flowers in flower water and have a wide spectrum of effectiveness in respect to the various plant species available commercially. They are, for example, suitable for chrysanthemums, carnations, irises, gerberae, roses, calendulae, gladioluses, lilies, and so on.

The following specific embodiments are illustrative of the invention without being limitative in any respect.

EXAMPLE 1

A solution was prepared that contained in one liter 0.05gm of 2-bromo-2-nitropropanediol-(1,3) and 21 gm of sugar. Roses (Bel ange) whose foliage was removed to the highest level of the flower water and whose stems immediately before the introducing, were cut slantingly, were placed into this solution.

The development of the blossoms and durability of these roses were markedly improved (8 days of keeping fresh as against 5 days) compared to such that were put into tap water. During the time of observation no damage on foliage and blossoms could be found.

EXAMPLE 2

A solid nutrient preserving agent of the following composition was prepared:

| Parts by Weight | |
|---|---|
| 99.5 | Dextrose |
| 0.25 | 2-Bromo-2-nitropropanediol-(1,3) |
| 0.25 | Boric acid. |

Chrysanthemums (Chrys. indicum) that were pretreated, as described in Example 1, were placed in solutions that contained each time 30 gm of this agent in one liter. The durability of blossoms and leaves of the samples was markedly improved compared to such that were placed in tap water (17 days against 11 days). No discolorations of blossoms and leaves could be found during the observation time.

EXAMPLE 3

A liquid nutrient agent of the following composition was prepared:

| Parts by Weight | |
|---|---|
| 55.55 | Cane sugar |
| 0.666 | Succinic acid |
| 0.333 | $AlCl_3 \cdot 6H_2O$ |
| 0.113 | 2-Bromo-2-nitropropane diol-(1,3) |
| 0.03 | Boric acid |
| | Residue to 100 parts by weight of water. |

For reasons of comparison liquid nutrient agents were prepared in which, with an otherwise identical composition, the 2-bromo-2-nitropropanediol-(1,3) was substituted by the same amount of the following antimicrobial effective substances:

Sodium salt of p-chloro-m-cresol, sorbic acid, hexamethylenetetraamine, formalin, "Omazide 24" (commercial product of Olin-Chemicals Co.), "Diamin A" (quaternary ammonium salt, commercial product of the Bayer Co.).

Each time 30 ml of these liquid nutrient agents were diluted with 1 liter of water and roses (Bel ange), chrysanthemums (Chrys. indicum) and carnations introduced, after the cut flowers had been prepared as in Example 1. While the withering process proper was markedly delayed with all solutions, compared to experiments with tap water, only the cut flowers put into the solutions containing 2-bromo-2-nitropropanediol-(1,3) were completely free of damaged leaves and blossoms. In all other cases after 3 to 6 days more or less, dependent upon the plant species, strong brownish discolorations appeared on leaves and blossoms of the cut flowers.

EXAMPLE 4

An aqueous solution was prepared that contained the following ingredients::

55.55 parts by weight of cane sugar,
0.666 parts by weight of succinic acid,
0.333 parts by weight of aluminum chloride, 6H$_2$O,
0.113 parts by weight of germicide:
 (a) 2-bromo-2-nitro-propanediol-(1,3)
  (the invention)
 (b) p-chloro-m-cresol
  (prior art)
 (c) phenyl-mercury-borate
  (prior art)
 (d) dodecyl trimethyl ammonium chloride
  (prior art)
0.03 parts by weight of boric acid, Residue to 100 parts by weight of water. The smallest antimicrobially effective dosage was used. Each time 30 ml of this liquid concentrate was diluted with 1 liter of tap water. In such solutions, cut flowers of the same degree of ripeness were stored utilizing glass containers as the flower vessels. The flowers were kept for several days in the solution. For comparison similar flowers were kept in regular tap water. As comparative figure, the number 100 was defined as the durability of the folwers in tap water.

The durability of the leaves until the blossoms withered is indicated by the following values:
1 — fresh and green
2 — yellowing and other discolorations
3 — necroses to complete drying The following Table I shows the durability of different cut plant species and the leaves when germicides (a), (b), (c) and (d) were utilized.

TABLE I

| Flower | Germicide | Durability of the blossoms (water = 100) | Durability of the leaves |
|---|---|---|---|
| Rose | a | 180 | 1 |
| (Bel ange) | b | 110 | 2 |
|  | c | 94 | 2 |
|  | d | 108 | 2 |
| Chrysanthemum | a | 170 | 1 |
|  | b | 108 | 3 |
|  | c | 103 | 3 |
| Carnation | a | 243 | 1 |
|  | b | 128 | 1 |
|  | c | 109 | 1 |
|  | d | 118 | 1 |
| Tulip | a | 138 | 1 |
|  | c | 94 | 1 |
|  | d | 102 | 2 |

The prior art preserving agent compositions which utilize germicides (b), (c) and (d) caused considerable damage to leaves and stems when used in the indicated concentrations per liter of vase water; and each also lowered the durability of the flowers and leaves, especially roses, carnations, tulips and chrysanthemum, when compared to the flowers and leaves kept in the preserving agent composition according to the invention.

The 2-bromo-2-nitro-propanediol-(1,3), germicide (a), in the preserving agent composition according to the invention proved to have excellent cut flower compatibility properties. The durability of different cut flowers and leaves was considerably improved by the addition of a combination of the present invention. The glass vases utilized for the composition of the invention did not show any clouding of the inner side of the glass walls and could be cleaned subsequent to the tests simply by rinsing with water.

EXAMPLES 5

An aqueous solution was prepared that contained the following ingredients:

55.55 parts by weight of cane sugar,
0.666 parts by weight of succinic acid
0.333 parts by weight of aluminum chloride. 6H$_2$O,
0.113 parts by weight of 2-bromo-2-nitropropanediol-(1,3),
0.03 parts by weight of boric acid, Residue to 100 parts by weight of water. Each time 30 ml of this liquid concentrate was diluted with 1 liter of tap water. In such solutions, cut flowers of the same degree of ripeness were stored utilizing glass containers as the flower vessels. The flowers were kept for several days in the solution. For comparison similar flowers were kept in regular tap water. As comparative figure, the number 100 was defined as the durability of the flowers in tap water.

Table II shows the durability of different cut plant species and the bacterial count when 2-bromo-2-nitropropanediol-(1,3) was utilized as the germicide.

TABLE II

| Plant | Durability (Water = 100%) | Bacterial Density in Vase Water after 5 days (Colony count in Culture Medium) | |
|---|---|---|---|
|  |  | Example 5 | Water |
| Carnation, Crowly Sim | 143 | No bacterial count | No bacterial count |
| Tulip, Appel Doorn | 138 | 240 | infinite |
| Chrysanthemum, Tokyo | 288 | 160 | infinite |
| Chrysanthemum, Golden Gate | 436 | No bacterial count | No bacterial count |

EXAMPLE 6 (Comparative)

An aqueous solution of a preserving agent was prepared that contained the following ingredients:

55.55 parts by weight of cane sugar,
0.666 parts by weight of succinic acid,
0.333 parts by weight of aluminum chloride. 6H$_2$O,
0.113 parts by weight of benzyl-dimethylalkyl ammonium chloride (Benzalkon A) disclosed in U.S. Pat. No. 2,923,094 to Ryan,
0.03 parts by weight of boric acid, Residue to 100 parts by weight of water. Each time 30 ml of this liquid concentrate was diluted with 1 liter of tap water.

In such solutions, cut flowers of the same degree of ripeness were stored utilizing glass containers as the flower vessels. The flowers were kept for several days in the solution. For comparison similar flowers were kept in regular tap water.

The above-mentioned preserving agent caused considerable damage to leaves and stems when used in concentrations of 50 to 300 mg per liter vase water, and also lowered the durability of the plants especially carnations, tulips and various species of chrysanthemums, when compared to the flowers kept in regular tap water.

EXAMPLE 7 (Comparative)

An aqueous solution of a preserving agent was prepared that contained the following ingredients:

55.55 parts by weight of cane sugar,
0.666 parts by weight of succinic acid,
0.333 parts by weight of aluminum chloride. $6H_2O$,
0.113 parts by weight of phenyl-mercury-borate (Merfen), a known prior art germicide,
0.03 parts by weight of boric acid, Residue to 100 parts by weight of water. Each time 30 ml of this liquid concentrate was diluted with 1 liter of tap water. In such solutions, cut flowers of the same degree of ripeness were stored utilizing glass containers as the flower vessels. The flowers were kept for several days in the solution. For comparison similar flowers were kept in regular tap water.

The above-mentioned preserving agent caused considerable damage to leaves and stems when used in concentrations of 50 to 300 mg per liter vase water, and also lowered the durability of the plants, especially carnations, tulips, and various species of chrysanthemus, when compared to the flowers kept in regular tap water.

EXAMPLE 8 (Comparative)

An aqueous solution of a perserving agent was prepared that contained the following ingredients:

55.55 parts by weight of cane sugar,
0.666 parts by weight of succinic acid,
0.333 parts by weight of aluminum chloride, $6H_2O$,
0.113 parts by weight of parachloro-meta-cresol (CMK), a known prior art germicide,
0.03 parts by weight of boric acid, Residue to 100 parts by weight of water. Each time 30 ml of this liquid concentrate was diluted with 1 liter of tap water. In such solutions, cut flowers of the same degree of ripeness were stored utilizing glass containers as the flower vessels. The flowers were kept for several days in the solution. For comparison similar flowers were kept in regular tap water.

The above-mentioned preserving agent caused considerable damage to leaves and stems when used in concentration of 50 to 300 mg per liter vase water, and also lowered the durability of the plants, especially carnations, tulips, and various species of chrysanthemums, when compared to the flowers kept in regular tap water.

The prior art preserving agent compositions of Comparative Examples 6, 7 and 8 caused considerable damage to leaves and stems when used in concentrations of 50 to 300 mg per liter of vase water; and each also lowered the durability of the plants, especially carnations, tulips and various species of chrysanthemum, when compared to the flowers kept in regular tap water. Consequently, these agents did not function as effective preservation agents for keeping cut flowers fresh.

In contrast to this, the 2-bromo-2-nitro-propanediol-(1,3) of the invention proved to have excellent cut flower compatibility properties. The durability of different cut plant species was considerably improved by the addition of a combination corresponding to that of Example 5 of the present invention, and the bacterial count was considerably lower as compared with that of pure water. The glass vases utilized in Examples according to the invention did not show any clouding of the inner side of the glass walls and could be cleaned subsequent to the tests simply by rinsing with water.

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. An aqueous nutrient concentrate composition for preserving cut flowers consisting essentially of from 20 to 70 parts by weight of a sugar, from 0.2 to 3.0 parts by weight of acidic-reacting substances, said acidic-reacting substances being selected from the group consisting of aluminum sulfate, aluminum chloride, ammonium-aluminum sulfate, sodium-aluminum sulfate, potassium-aluminum sulfate, aluminum tartronate, aluminum formate, nickel chloride, zinc chloride, citric acid, tannic acid, tartaric acid, succinic acid, boric acid, sodium bisulfate, sodium bisulfite, acidic sodium phosphates, and the mixtures thereof from 0.01 to 1.0 parts by weight of 2-bromo-2-nitropropanediol-(1,3), from 0 to 0.1 parts by weight of plant growth promoting compounds, said plant growth promoting compounds being selected from the group consisting of β-indolylacetic acid, chlorochloline chloride, gibberellinic acid, α-naphthylacetic acid, and 2,4-dichlorophenoxyacetic acid, and the remainder to 100 parts by weight, of water.

2. The method of preserving cut flowers which consists of adding from 20 to 50 gm/liter of the aqueous nutrient concentrate of claim 1 to flower water and inserting cut flowers therein.

3. The aqueous nutrient concentrate composition for preserving cut flowers of claim 1, in which said acidic reacting substances are selected from the group consisting of boric acid, aluminum chloride, succinic acid and the mixtures thereof.

4. The aqueous nutrient concentrate composition for preserving cut flowers of claim 1, in which said acidic reacting substance is boric acid.

5. The aqueous nutrient concentrate composition for preserving cut flowers of claim 1, in which said acidic reacting substance in a mixture of succinic acid, aluminum chloride and boric acid.

6. The aqueous nutrient concentrate composition for preserving cut flowers of claim 1, in which said plant growth promoting compound is β-indolylacetic acid.

* * * * *